United States Patent [19]

Kullmann et al.

[11] 4,063,122

[45] Dec. 13, 1977

[54] ROTOR CONTAINING A FIELD WINDING COOLED TO A LOW TEMPERATURE

[75] Inventors: Dieter Kullmann, Langenzenn; Lutz Intichar, Nurenberg, both of Germany

[73] Assignee: Siemens Aktiengesellschaft, Berlin and Munich, Germany

[21] Appl. No.: 566,839

[22] Filed: Apr. 10, 1975

[30] Foreign Application Priority Data

Apr. 16, 1974 Germany .............................. 2418260

[51] Int. Cl.$^2$ .............................................. H02K 3/24
[52] U.S. Cl. ................................... 310/64; 310/10
[58] Field of Search .............. 310/64, 52, 10, 261, 310/40, 264, 265, 269, 164, 58, 59, 61, 165

[56] References Cited

U.S. PATENT DOCUMENTS

| 3,242,418 | 3/1966 | Mela .................................. 310/10 |
| 3,487,243 | 12/1969 | Wiedemann ..................... 310/64 |
| 3,644,766 | 2/1972 | Hughes ............................. 310/40 |
| 3,648,082 | 3/1972 | MacNab ........................... 310/10 |
| 3,679,920 | 7/1972 | MacNab ........................... 310/52 |
| 3,742,265 | 6/1973 | Smith ................................ 310/52 |
| 3,743,867 | 7/1973 | Smith ................................ 310/52 |
| 3,745,389 | 7/1973 | Lorch ................................ 310/52 |
| 3,778,649 | 12/1973 | Lehuen ............................. 310/61 |
| 3,781,578 | 12/1973 | Smith ................................ 310/52 |
| 3,816,780 | 6/1974 | Smith ................................ 310/52 |
| 3,891,875 | 6/1975 | Laskaris ........................... 310/40 |

OTHER PUBLICATIONS

"MIT-EEI Program on Large Super Cond. Machines"; J. L. Kirley, Jr., et al.; IEEE, vol. 61, No. 1, 01/01/73; pp. 112-115.

*Primary Examiner*—R. Skudy
*Attorney, Agent, or Firm*—Kenyon & Kenyon, Reilly, Carr & Chapin

[57] ABSTRACT

An improved rotor for an electric machine, particularly for a synchronous machine, comprising a field winding cooled to a low temperature in which the rotor includes a concentric, hollow, cylindrical support body having internal slots on its inside for accommodating the field winding so that the winding can be placed in the slots in a simple manner and the windings retained more securely therein.

7 Claims, 2 Drawing Figures

ROTOR CONTAINING A FIELD WINDING COOLED TO A LOW TEMPERATURE

BACKGROUND OF THE INVENTION

This invention relates to electric machines in general and more particularly to synchronous machines having a field winding which is cooled to a low temperature.

The use of superconducting windings in electric machines permits a substantial increase of the flux in the air gap between the rotor and the stator of the machine. Futhermore, higher current densities may be obtained using superconductors with winding losses essentially eliminated. The ratio of power to volume and weight in such machines utilizing superconducting field windings is thus considerably higher than in a machine of conventional design. As described in the "Proceedings IEEE," Vol. 61 (1973), pages 112 to 115, a known turbo generator has a stationary outer armature and a revolving superconducting field winding. Since the field winding must be kept at a very low temperature, good thermal insulation of the rotor is provided, the insulation being achieved through the use of a high vacuum. To accomplish this an evacuated cylinder is required. The outer wall of the stationary vacuum cylinder carries a stator winding. The core of the rotor is formed by a tube of austenitic steel, on which the superconducting wires are arranged. The individual layers of the windings are held together to counteract centrifugal and magnetic forces using glass fiber and plastic tapes. The winding package so formed is further enclosed by a vacuum tight steel tubular enclosure.

Because of the differential thermal contraction of the materials used in the rotor and windings, displacement or deformation of individual conductors in the windings cannot be prevented after the rotor is cooled down. As is well known by those skilled in the art conductor movements of this nature are related to the generation of mechanical friction and deformation heat along with local flux changes. This can lead to at least a portion of the field winding going into a normally conducting state.

Another generator using a superconducting field winding is disclosed in U.S. Pat. No. 3,679,920. In the arrangement disclosed therein, the rotor comprises a support cylinder of non-magnetic material such as stainless steel. The individual conductors of the field winding are arranged either in slots cut on the outside surface of the support cylinder as shown on FIG. 2 or on the inside of a support cylinder using a hardenable plastic as shown on FIG. 5. However, windings of this nature on the inside of the support cylinder are difficult to manufacture. Furthermore, difficulties arise in attempting to cool these windings and the danger exists that, should a portion of the winding become normally conducting, the heat produced will not be removed fast enough and the entire winding will become normally conducting.

In view of these difficulties with the prior art arrangements the needs for an improved rotor for such an electrical machine in which the field winding is easier to manufacture, deformation of the conductors of the winding is eliminated during cooling and operation, and efficient cooling of the windings takes place, is evident.

SUMMARY OF THE INVENTION

The present invention provides such a rotor which is particularly useful in a synchronous machine. This is accomplished through the provision of a concentric, hollow, cylindrical support body having a plurality of internal slots for accommodating the conductors of the field winding on its inside. Through such an arrangement the conductors can be arranged in the slots in a simple manner. It is possible to fabricate from elongated individual conductors, which need only a few solder joints, windings which can be installed in a simple manner and whose winding desity can be varied. The radial forces acting on the conductors during operation will tend to push them more firmly into the slots and thus make it more difficult to move.

In accordance with a further feature of the rotor of the present invention the internal slots on the support body are arranged at a regular spacing on the inside thereof and have an at least approximately rectangular cross-section. As a result, the moments acting on the conductors are transmitted to tooth-shaped intermediate portions between the slots and represent portions of the torque transmitting winding body. As a result, a uniform utilization of the material strength of the hollow cylindrical support body is utilized.

DETAILED DESCRIPTION OF THE PREFERRED EMBODIMENT

Figure 1:
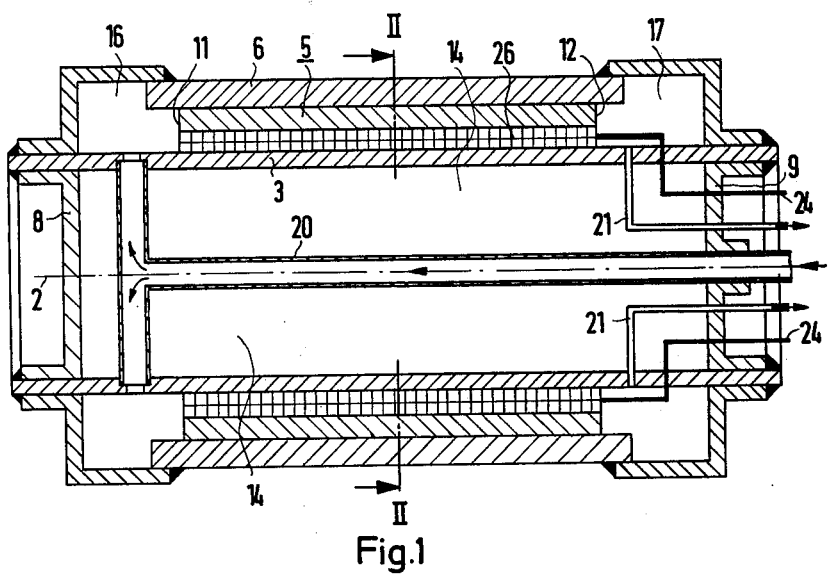
FIG. 1 is a longitudinal cross-section through a rotor according to the present invention.

FIG. 1 is a longitudinal cross-section through a rotor for an electrical machine, such as a synchronous machine, according to the present invention. In conventional fashion the rotor will be supported for rotation about an axis 2. It comprises an inner cylinder 3 of circular cross-section made of, for example, a non-magnetic material such as austenitic steel or titanium. Inner cylinder 3 is surrounded by a concentric, hollow, cylindrical support body 5. The support body 5, which is of a similar non-magnetic material as the inner cylinder 3 is the support for the field windings. For this purpose the support body 5 contains, on its inside wall, internal slots which are shown in more detail on FIG. 2. Within these slots conductors for the field winding are accommodated. As illustrated on FIG. 2, the slots are designated 25 and the conductors therein as 26. The conductors for the field winding will preferably be of superconductive material. Surrounding the hollow, cylindrical support body 5, which contains the windings, is an additional non-magnetic hollow cylinder 6 mounted in a close fitting and force transmitting manner. The outer cylinder will also preferably be of the same material as the hollow cylindrical support body 5 and the inner cylinder 3.

For lateral enclosure of the rotor, two essentially disc-shaped end pieces 8 and 9 are provided which are rigidly connected to the end faces of the inner cylinder 3 and outer cylinder 6. As illustrated, at the point of attachment the cylinders overhang the end faces 11 and 12 of the hollow cylindrical support body 5. Attachment of the pieces together may be by welding or soldering. The inner cylinder 3 is fitted in a vacuum-tight manner into the lateral parts 8 and 9 and along with those parts forms an interior space 14 which is closed off in a vacuum-tight manner, for example, with respect to an outer vacuum space.

Since a predetermined distance exists between the end faces 11 and 12 of the support body 5 and the end pieces 8 and 9, approximately annular cavities 16 and 17 are formed at the respective end faces 11 and 12, the spaces being defined by the inner cylinder 3, the outer cylinder 6 and the end pieces 8 and 9. Because the conductors 26 of the field winding must be cooled to a low temperature, a suitable coolant, such as helium where superconducting windings are used, is fed into the cavity 16 and is discharged on the opposite side through the cavity 17. In the illustrated embodiment a coolant feed pipe 20 is provided for feeding coolant into the cavity 16. It is brought in through the end piece 9 and the space 14 in a vacuum-tight manner and is disposed concentric to the axis of rotation 2. Through suitable openings it is coupled to the cavity 16. In similar fashion coolant is discharged from the cavity 17 using discharge pipes 21. The flow direction of the coolant is illustrated on the figure by the arrows.

Also illustrated on FIG. 1 is an electrically insulated current lead 24. Through this lead, exciter current is fed through the end piece 9 into the space 14 and thence through the inner cylinder 3 and cavity 17 to the conductors 26 of the field winding.

Figure 2:
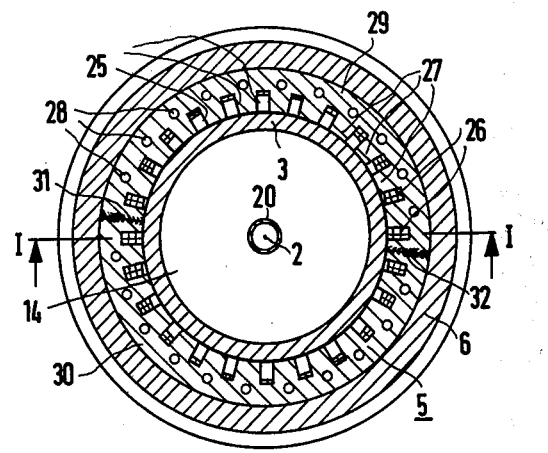
FIG. 2 is a transverse cross-section through the same rotor.

In the cross-section of FIG. 2, the coolant feed pipe 20 is shown concentric to the axis 2. The inner cylinder 3 encloses this pipe concentrically with the space 14 formed between its inside and the coolant feed pipe. The concentric, hollow cylindrical support body 5 surrounds the inner cylinder 3 in a close fitting manner. As is clearly illustrated, support body 5 has equally spaced internal slots 25 on its inside. These may be formed, for example, by milling. In the illustrated embodiment 24 internal slots 25 are shown. They are equal distances from each other about the circumferance and each has rectangular cross-section. These slots contain the conductors 26, indicated schematically on the figure. The conductors can be placed into the slots 25 in a simple manner from the inside. In the manner illustrated the winding density may differ in the individual slots. Because the slots are rectangular, a tooth-shaped intermediate body 27 of approximately trapezoidal cross-section is formed between each two slots. As a result, the largest bending moment occurs at the wider base of the tooth-shaped intermediate bodies during operation of the electric machine. Thus, good stability of the material of the support body and the entire rotor is obtained.

As indicated above, the conductors 26 of the field winding are maintained at a low temperature using a coolant. In order that the coolant may get close to the windings for cooling, a plurality of coolant canals 28 are provided which can be, for example, holes in the tooth-shaped intermediate body portions 27 of the support body 5 or alternatively can be formed by means of spaces between the individual conductors 26 for the field windings in the slots 25. Coolant flows through these canals from the space 16 to the space 17 while cooling the individual conductors.

For ease of fabricating the winding the hollow, cylindrical body 5 is made up of two half-shells 29 and 30. The half-shells with their internal slots 25 can be wound directly. Special templates or later solder joints between the individual conductor portions are therefore not necessary and difficulties in inserting them in the slots 25 avoided. Once the winding is assembled, the two half-shells 29 and 30 are put together to form the support body 5 typically by a means of a welded joint. Thus, on FIG. 2 two welded joints 31 and 32 are illustrated. After welding, the outside surfaces are machined off prior to inserting or enclosing the support body in the outer cylinder 6 in a close fitting manner. Since torque must be transmitted from the support body 5 to the outer cylinder 6, means must be provided to ensure that the two bodies are rigidly coupled. This can be accomplished through the use of longitudinal ribs welded on the support body 5 engaging corresponding longitudinal slots on the inside of the outer cylinder 6. Furthermore, axial keys may be used which fit into corresponding axial openings in the outer cylinder 6 and support body 5. Similarly, radial pins through both the outer cylinder 6 and support body 5 may be used. In such a case the pin holes in the outer cylinder 6 can then be welded to restore the vacuum-tightness. In addition, it is possible to shrink the outer cylinder 6 onto the support body 5 to obtain a friction connection. The cavity between the two bodies can further be sealed by means of cementing or impregnating with a liquid metal such as gallium or gallium-indium.

The portions of the electric machine shown in the figures are related to a construction in which the superconducting field windings along with the support body of non-magnetic steel are kept at a low temperature and that the support body, which is also used to transmit the torque, consists of a cylinder as thin as possible and of high mechanical strength. Generally, in machines of this nature, for mechanical reasons, the inner portion of the machine rotates. Thus, the illustrated arrangement is for an embodiment such as a conventional turbo generator having a stationary outer armature and a rotating field winding. Since the field winding must be kept at a very low temperature, thermal insulation of the rotor must be provided. Generally, such can be achieved only through the use of a vacuum. To accomplish this it is possible for the entire cold rotor to run in a vacuum space. In such an embodiment a stationary outer cryostatic tube is provided and a shield built into the rotor to protect the superconducting field winding from magnetic alternating fields and to at the same time reduce the radiated heat. It can also be used in other embodiments in which the outer cryostat tube bounding the vacuum space rotates with the rotor. In such an embodiment the outside surface of the rotating cryostat is at room temperature. Thus, the rotor of the present invention is equally well suited for either an embodiment with a stationary or rotary outer cryostat tube. The cold rotor body carrying the winding is generally arranged within a co-rotating warm outer cryostat tube. In the space between, in which a high vacuum is generally maintained, a thin cylinder can be arranged in addition to act what is referred to as an electrothermal shield. Such a shield will absorb the heat radiated from the outer cylinder and furthermore will attenuate the balance of the magnetic fields which penetrate the corotating outer cryostat tube to an amount tolerable for the superconductors. In such an electric motor the stator will normally comprise an armature winding separated from the rotor by an air gap.

Thus, an improved arrangement for a rotor containing a field winding and which is cooled to a low temperature has been shown. Although a specific embodiment has been illustrated and described, it will be obvious to those skilled in the art that various modifications may be made without departing from the spirit of the invention which is intended to be limited solely by the appended claims.

What is claimed is:

1. A rotor for an electric machine such as a synchronous machine containing a field winding which is cooled to a low temperature comprising:
   a. an inner cylinder made of a non-magnetic material;
   b. a hollow cylindrical support body made of a non-magnetic material containing on its inside a plurality of internal slots, said cylindrical support body concentrically surrounding and being in close contact with said inner cylinder;
   c. a plurality of field windings disposed in the slots of said support body;
   d. means at each end of said rotor defining a pressure tight space between said inner cylinder and said support body which spaces are in communication with said internal slots; and
   e. means for supplying a cooling medium to the space at one end of said rotor and means for removing cooling medium at low temperature from the space at the other end of said rotor whereby said cooling medium will be conducted from one end of said rotor to an other end of said rotor past said field windings.

2. A rotor according to claim 1 wherein said support body comprises at least two partial shells of approximately equal size.

3. A rotor according to claim 1 wherein said field windings conductors which consist at least in part of superconductive material.

4. A rotor according to claim 1 and further including an outer concentric to said support body and coupled thereto in a force transmitting manner.

5. A rotor according to claim 1 and further including an outer cylinder concentric to said support body and coupled thereto in a force transmitting manner.

6. A rotor according to claim 1 wherein said internal slots on said support body are arranged on the inside thereof at a regular spacing and have an approximately rectangular cross-section.

7. A rotor according to claim 1 and further including an outer cylinder made of an non-magnetic material concentrically surrounding said support body and coupled thereto in a force transmitting manner and wherein said spaces are defined between said outer cylinder and said inner cylinder.

* * * * *